United States Patent Office 3,268,601
Patented August 23, 1966

3,268,601
PYROLYSIS OF p-XYLENE AND HALOGENATED HYDROCARBONS
Louis A. Errede, Roseville, Minn., assignor to Minnesota Mining and Manufacturing Company, St. Paul, Minn., a corporation of Delaware
No Drawing. Filed Sept. 4, 1962, Ser. No. 221,375
2 Claims. (Cl. 260—651)

This invention relates to new improvements in the chemistry of quinodimethanes (xylylenes).

It is known that p-xylene and related compounds may be pyrolyzed so as to prepare polymers. It is also known that pyrolysis of p-xylene and related compounds may be carried out in a manner so as to quench the pyrolyzate prior to the preparation of a polymer. In this manner, monomeric quinodimethanes are prepared in solution form. The solution may then be utilized to react by various mechanisms so as to form a variety of polymers and compounds.

It is an object of this invention to expand upon the technology relating to the pyrolysis of p-xylene and related compounds, especially as it pertains to preparation and use of quinodimethanes.

Another object is to teach various techniques for increasing the yield of quinodimethanes during pyrolysis. In one aspect, a catalytic method for the preparation of quinodimethanes is taught. Likewise, techniques for favoring the preparation of p-methylbenzyl radicals and related free radicals are taught.

Another object is to teach effective co-pyrolysis of p-xylene with various halogenated compounds that may be pyrolyzed to form free radicals.

A still further object of the invention is to teach a method for gas phase oxidation of the free radicals and compounds formed during the pyrolysis of p-xylene and related compounds.

Another object is to teach the gas phase synthesis of an organic compound by reacting dissimilar free radical sources.

Various other objects and advantages of the present invention will become apparent to those skilled in the art from the accompanying description and disclosure.

The term "quinodimethane" as used herein means an organic compound having a diunsaturated six-membered cyclic nucleus having each of two carbon atoms of the diunsaturated ring doubly bonded to the carbon atom of a methylene group. The methylene group may be substituted or unsubstituted. The diunsaturated ring which is common to each of the quinodimethanes will be positioned according to whether the methylene groups are ortho or para to each other. The preferred quinodimethanes of this invention are those having a symmetrically diunsaturated six-membered ring to which a methylene group is doubly bonded to para-positioned carbon atoms of the ring. The term quinodimethane as used herein includes those compounds which contain only the one ring such as, for example, in p-quinodimethane (also called p-xylylene) which has the structure:

as well as those compounds in which the quinoid ring is fused to one or more aromatically unsaturated six-membered rings such as, for example, in 1,4-naphthaquinodimethane which has the structure:

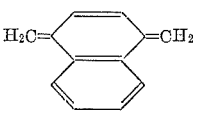

The aromatically unsaturated ring which is fused to the ring is referred to herein as the benzenoid ring.

It is to be understood that the quinodimethane starting material of this invention may be a carbocyclic compound, i.e. a cyclic compound in which each atom of the cyclic skeleton is a carbon atom such as in p-quinodimethane and 1,4-naphthaquinodimethane; or it may be a nitrogen-containing heterocyclic compound, i.e. a compound having at least one nitrogen atom as part of the cyclic skeleton. The heterocyclic compounds are preferably those in which the nitrogen is vicinal only to carbon and include those in which nitrogen is a constituent of the quinoid ring or the benzenoid ring.

The groups which are singly bonded to the cyclic skeleton of the quinodimethane are referred to herein as the nuclear substituents and may be hydrogen, halogen, alkyl, aryl, alkoxy, or aryloxy radicals. These substituents of the dicyclic compounds may be the same or different, and may be on the quinoid ring or on the benzenoid ring or on both rings. The methylene groups which are doubly bonded to the quinodimethane ring may be unsubstituted methylene groups, i.e. ($CH_2=$), or they may be substituted with halogen, alkyl, aryl, aralkyl, alkoxy, and aryloxy groups without departing from the scope of this invention.

The preferred quinodimethanes are those of the group consisting of p-quinodimethane, 1,4-naphthaquinodimethane, and corresponding heterocyclic quinodimethanes containing at least one heteronitrogen atom vicinal only to carbon atoms and the nuclear substitution products of the foregoing members with atoms of the normally gaseous halogens and methyl groups.

Among the specific carbocyclic aromatic compounds which can be pyrolyzed to produce the aforesaid quinodimethanes which are used as a reactant in accordance with the process of this invention are: p-xylene; pseudocumene; durene; isodurene; prehnitene; pentamethyl benzene; hexamethyl benzene; 1,4-dimethyl naphthalene; 1,2,3,4,6,7-hexamethyl naphthalene; 2-chloro-p-xylene; 2-fluoro-p-xylene; 2,5-difluoro-xylene; 2,5-dichloro-p-xylene; 2,3,5-trichloro-p-xylene; 2,3,5-trifluoro-p-xylene; 2,3,5,6-tetrachloro-p-xylene; 2,3,5,6 - tetrafluoro - p - xylene; 2-chloro-3,5,6-trimethyl benzene; 6-chloro-1,4-dimethyl naphthalene; and 2,3,6,7-tetrachloro - 1,4 - dimethyl naphthalene. Among the specific aromatically unsaturated nitrogen-containing heterocyclic compounds which are pyrolyzed to yield the heterocyclic quinodimethanes which are reacted as described herein are: 2,5-dimethyl pyrazine; 2,5-lutidine; 2,5-dimethyl pyrimidine; 5,8-dimethyl quinoline; 1,4-dimethyl isoquinoline; 5,8-dimethyl isoquinoline; 5,8-dimethyl quinazoline; 5,8-dimethyl quinoxaline; 2,3,5-trimethyl pyrazine; 2,3,5,6-tetramethyl pyrazine; 2,3,5-trimethyl pyridine; 2,4,5-trimethyl pyridine; 5,6,8-trimethyl quinoline; and 2,5-dimethyl-6-chloropyrazine.

The pyrolysis of the aforesaid 1,4-dimethyl substituted aromatic compounds is preferably carried out at a temperature within the range of about 900° C. to about 1300° C., for example, at about 1000° C. For best results the aromatic vapor should be present at a partial pressure of less than 150 mm. mercury. The pyrolysis can be conducted in the presence of an inert gas, such as carbon dioxide, steam or nitrogen, particularly when the partial pressure of the aromatic compound is 10 mm. mercury or below. Within the preferred pyrolysis temperature range the contact time should be within the range of from about 0.1 to about 0.001 second. In those cases where the quinodimethane is the desired product, the pyrolyzed vapors are quenched in a liquid maintained at a temperature below 45° C.

The liquid used for quenching and storing of the quinodimethane may be of any composition which remains liquid at the necessary temperature range and which has a relatively low partial pressure at about −45° C. consistent with the upper total pressure limit of 400 mm. mercury pressure and preferably low enough to permit operation below 10 mm. mercury pressure. The liquid also should be substantially non-reactive with the quinodimethane formed, although liquids which react to some slight degree may be used. Among the specific liquids which may be used for quenching are the paraffinic and cycloparaffinic hydrocarbons of low freezing point, such as hexane, petroleum ether, cyclopentane and 1,4-dimethyl cyclohexane; the aromatic hydrocarbons of low freezing point, such as toluene, ethyl benzene, o-ethyl toluene and m-diethyl benzene; the halogenated hydrocarbons of low freezing point, such as o-chloroethyl benzene, o-fluoro toluene and 1,1-dichloroethane; carbonyl compounds of low freezing point such as acetone, methyl ethyl ketone and methyl isobutyl ketone; ethers of low freezing point, such as diethyl ether, ethyl n-propyl ether and tetrahydrofurane; alcohols of low freezing point, such as methanol, ethanol and isopropyl alcohol; and other normally liquid compounds of low freezing point, such as carbon disulfide. If desired, liquids of low freezing point may be obtained by the blending of two or more compounds of higher freezing point. For example, mixtures of carbon tetrachloride and chloroform may be used.

EXAMPLE I

This example illustrates the pyrolysis of various halogenated compounds to form free radicals and the co-pyrolysis of these compounds with free radicals formed by the pyrolysis of para-xylene.

(A) *Pyrolysis of carbon tetrachloride.*—Pyrolysis of carbon tetrachloride was carried out using the apparatus shown in FIGURE 1 of L. A. Errede and B. F. Landrum, J. Am. Chem. Soc., 79, 4952 (1957), according to the procedure described previously for the pyrolysis of p-xylene in L. A. Errede and J. P. Cassidy, J. Am. Chem. Soc., 82, 3653 (1960); L. A. Errede and B. F. Landrum, J. Am. Chem. Soc., 79, 4952 (1957) and L. A. Errede, R. S. Gregorian and J. M. Hoyt, J. Am. Chem. Soc., 82, 5218 (1960). The system was evacuated to the desired pressure and the furnace was adjusted to afford the desired maximum temperature and temperature profile. About 10 moles of carbon tetrachloride was metered at the rate of approximately 0.04 mole/min., to the evacuated system through a calibrated capillary. Pyrolysis occurred in a 1-inch I.D. quartz tube for about 0.005 sec. at 4 mm. Hg pressure. The pyrolysis zone (i.e., the distance along the tube through which the gas was no less than 50° C. below its maximum temperature of 1000° C.) was about five inches long. The pyrolyzate was collected in heptane (3 liters) kept at −78° C. so that the chlorine condensed therein would be converted to chloroheptanes. A smaller liquid nitrogen trap was used in series with the large Dry Ice trap. At the end of the pyrolysis the cold traps were warmed to room temperature. The resultant solutions were combined. The solvent and volatile product of pyrolysis were separated by distillation at atmospheric pressure to afford four fractions: (1) B.P. 77–117° C., (2) B.P. 117–127° C., (3) B.P. 140–148° C., (4) residue. Fractions 1 to 3 were analyzed by means of a mass spectrometer. Fraction 1 was a mixture of n-heptane, tetrachloroethane and carbon tetrachloride. Fraction 2 was essentially all tetrachloroethane, and fraction 3 was a mixture of chloroheptanes. The total amount of $CCl_4$ and $CCl_2=CCl_2$ isolated in these fractions represented by 48% and 45% respectively of the carbon atoms metered to the pyrolysis system as carbon tetrachloride. The residue was a mixture of hexachloroethane and hexachlorobenzene. The former was separated from the latter by leaching the residue with methanol. Hexachloroethane crystallized in the form of white platelets (M.P. 181–183° C.) from the hot concentrated alcohol extract.

Calcd. for $C_2Cl_6$: C, 10.15; Cl, 89.84; mol. wt. 236.8. Found: C, 10.14; Cl, 90.1; mol. wt. 221.

The methanol insoluble residue was recrystallized from hot carbon tetrachloride and hexachlorobenzene was obtained in the form of fine white needles (M.P. 224–226° C.).

Calcd. for $C_6Cl_6$: C, 25.29; Cl, 74.69; mol. wt. 284.8. Found: C, 25.19; Cl, 74.36; mol. wt. 269.

The amount of $C_2Cl_6$ and $C_6Cl_6$ isolated in fraction 4 represented 6% and 0.6% of the total carbon atoms metered to the system as carbon tetrachloride.

(B) *Co-pyrolysis of p-xylene and carbon tetrachloride.*—p-Xylene (12.1 moles) and carbon tetrachloride (13.9 moles) were metered to the pyrolysis system through separate calibrated capillaries at the rate of 0.035 and 0.040 mole/min. respectively. The two gas streams were mixed within the 1 inch I.D. quartz tube where co-pyrolysis occurred at 1005° C. and 4.7 mm. for 0.003 sec. residence time. The pyrolyzate was collected in 4.0 liters of hexane kept at −78° C. The resultant solution was warmed to room temperature. No polymer formed, indicating the absence of any residual p-xylylene in the gas stream when it reached the condenser. The solvent of the clear solution was removed by rapid evaporation at 60 mm. and 100° C. in a solvent stripper. The liquid was metered through the top of the evacuated apparatus. The volatile components were vaporized as the liquor cascaded down the steam heat column, and were removed through an overhead side arm. The non-volatile components were collected in a receiving flask at the bottom of the reactor. A previous trial run using a synthetic mixture showed that virtually all the hexane and xylene are removed in this way with only a negligible loss (<1%) of p-methylbenzyl chloride, β,β-dichloro-p-methylstyrene and p-xylylene chloride. The last traces of p-xylene were removed by evaporation under a stream of nitrogen. The residue (291 g.) was a dark oil that contained 28.6% chlorine. This was dissolved in one liter of hexane and the resulting solution was chilled to −78° C. in an attempt to cause precipitation of any p-xylylene dichloride that might have been present. No precipitate was obtained, indicating that very little, if any, of this compound was present since the solubility of p-xylylene dichloride in one liter of similar solutions at −78° C. is less than a gram. The hexane was removed by evaporation and the residue was separated by distillation at 1.0 mm. pressure. Four major fractions were obtained: (1) 80 g., amber oil, B.P. 40–46° C.; M.P. −2° to 0° C.; (2) 82 g., B.P. 65–79° C.; M.P. 28–30° C.; (3) 39 g., amber oil, B.P. 100–120° C.; (4) 50 g., residue which did not distill below 200° C.

Fraction 1 gave a positive test for active halogen using alcoholic $AgNO_3$. The infrared spectrum of this fraction was substantially that of p-methylbenzyl chloride and this structure was supported by elementary analysis.

Calcd. for $C_8H_9Cl$: C, 68.38; H, 6.40; Cl, 25.26; mol. wt. 140.5. Found: C, 68.7; H, 5.82; Cl, 25.3; mol. wt. 141.

A sample of the chloride was converted to the corresponding nitrile by treatment with NaCN in methanol-water solution. Subsequent hydrolysis and acidification yielded p-tolylacetic acid which after one recrystallization from hexane was obtained in the form of white flat needles (M.P. 86–88° C.; no depression when mixed with known sample of p-tolylacetic acid).

Fraction 2 was recrystallized from methanol at −78° C. and β,β-dichloro-p-methyl-styrene was obtained in the form of tiny white platelets (M.P. 32.0–32.5° C.) having a characteristic licorice-like odor. The assigned structure was verified by its infrared spectrum in Nujol (strong bands as 6.23, 7.90, 11.07, 11.60, 12.00, 12.47, 13.25, 14.13 and 14.85μ), nuclear magnetic resonance spectrum [τ values 7.68 for $CH_3$, 3.25 for olefinic CH, 2.63 and 2.90 (A–B type peak) for aromatic CH], and by elemental analysis.

Calcd. for $C_9H_8Cl_2$: C, 57.77; H, 4.33; Cl, 37.90; mol. wt. 187.1. Found: C, 57.5; H, 4.01; Cl, 38.0; mol. wt. 184.

A sample of the compound was oxidized with $KMnO_4$ in acetone to give p-toluic acid (M.P. 176–177° C.; no depression when mixed with known sample of p-toluic acid).

Fraction 3 was dissolved in methanol and chilled to —78° C. causing 13 g. of 1,2-di-p-tolylethane to crystallize from solution in the form of white platelets (M.P. 74–76° C., no depression when mixed with known sample 1,2-di-p-tolylethane). The infrared spectrum of this product was identical with that of a known sample 1,2-di-p-tolylethane. The methanol mother liquor was evaporated to constant weight (26 g.) and the residue was redistilled under vacuum. The infrared spectrum of the distillate indicated that it was a mixture composed of alkylated diphenylmethanes with a small amount of 1,4-di-p-tolylethane. A qualitative test for chlorine (sodium fusion followed by $AgNO_3$) indicated the presence of chlorine in only trace amounts.

Fraction 4 was not separated further. The infrared spectrum of this fraction indicated that it was a complex mixture of alkylated aromatics. The average molecular weight was 631, as determined by freezing point depression of cyclohexane, and it contained 17.2% chlorine, which corresponds roughly to about 0.6 chlorine atom per xylyl unit.

Thus, in this example, co-pyrolysis of 12.1 moles of p-xylene and 13.9 moles carbon tetrachloride gave 0.57 mole p-methylbenzyl chloride, 0.44 mole β,β-dichloro-p-methylstyrene, 0.35 mole of p-methylbenzyl equivalents isolated as 1,4-di-p-tolylethane or diphenylmethanes and 0.40 mole p-methylbenzyl as partially chlorinated non-distillable residue.

(C) *Pyrolysis of p-xylene and carbon tetrachloride in separate co-axial streams.*—The pyrolysis system was modified such that the internal thermowell was replaced by an open quartz tube (3 mm. I.D., 7 mm. O.D.) through which the chlorocarbon stream was metered for pyrolysis. The temperature was measured by an external thermocouple that travelled parallel to the quartz pyrolysis tube between the tube and the furnace. The open end of the inner tube extended 1.5 inches beyond the furnace to a point where the temperature was about 600° C., or at a point 4.5 inches beyond the pyrolysis zone where the temperature was 990 to 1040° C. at its center. The system was evacuated to 4.5 mm. and p-xylene (7.6 moles) was metered through the outer concentric tube at the rate of 0.32 mole/min. while carbon tetrachloride (8.8 moles) was metered through the inner concentric tube at the rate of 0.037 mole/min. Pyrolysis occurred independently in the two concentric tubes for $5 \times 10^{-3}$ and $4 \times 10^{-4}$ sec. residence time, respectively, and confluence occurred at the blend point 1 inch beyond the furnace, where the temperature was about 600° C. The resultant gas mixture was collected in 4 liters of hexane kept at —78°. The resultant solution was warmed to room temperature and the excess solvent was removed by rapid evaporation at 60 mm. pressure, and 100° C. as described in B above and the non-volatile products of interaction were collected as residue. The pyrolysis experiment was repeated three more times so that totals of 30.5 moles of p-xylene and 35.2 moles of carbon tetrachloride were passed through the outer and inner concentric tubes respectively to afford a sum total of 684 g. of non-volatile mixture of reaction products.

The residues were combined and then dissolved in 3.4 liters of hexane. The resultant solution was chilled to —78° and p-xylylene dichloride (77 g.) precipitated in the form of grayish crystals (M.P. 90–95°). Upon recrystallization from methanol, white crystals melting at 95–97° were obtained. The compound was confirmed as p-xylylene by reaction with NaCN in an ethanol water solution to give p-xylylene dicyanide (M.P. 95.5–96.5°). The dicyanide was then hydrolyzed in aqueous NaOH to the salt of p-phenylenediacetic acid. Acidification with mineral acid afforded the free acid (M.P. 243–245°). The melting points and infrared spectra of the p-xylylene dichloride and its subsequent derivatives were the same as those of known samples.

The hexane mother liquor from which p-xylylene dichloride was removed by filtration was evaporated to dryness under a stream of nitrogen. The residue was separated by distillation at 1.5 mm. and the following fractions were isolated:

(1) 231 g. p-methylbenzyl chloride, B.P. 54–60°, M.P. —2 to 0°.

(2) 5 g. amber oil, B.P. 85–100°. The sample was dissolved in hot methanol and then chilled to room temperature to afford 1.1 g. p-xylylene dichloride M.P. 97–98° C. The solute in the mother liquor was recovered by evaporation to dryness. The infrared spectrum of this residue indicated that it was mostly a mixture of diarylmethanes and 1,2-di-p-tolylethane.

(3) 154 g. amber oil, B.P. 100–126°. This oil was dissolved in methanol and chilled to —78° to afford 20 g. of di-p-tolylethane (M.P. 74–76°). The solute was recovered from the mother liquor by evaporation to dryness. The amber residue was the usual mixture of diarylmethanes and 1,2-di-p-tolylethane.

(4) 150 g. of non-distillable residue. The elemental analysis (19.1% Cl; 4.70% H; and 74.8% C) of this fraction corresponds to an average empirical formula of $(C_8H_5Cl_{0.7})_n$. Its average molecular weight was approximately 2000. The dark oily residue was composed primarily of tars.

Thus, the pyrolysis of 30.5 moles of p-xylene and 35.2 moles of carbon tetrachloride in two concentric streams that blended at a point 4.5 inches beyond the pyrolysis zone produced 1.65 moles of p-methylbenzyl chloride, 0.45 mole p-xylylenedichloride, 1.46 moles of p-methylbenzyl equivalents isolated as diarylmethanes and 1,2-di-p-tolylethane and 1.18 moles of non-volatile residue whose average empirical formula was $(C_8H_6Cl_{0.7})_n$.

Table 1 summarizes the results obtained by blending the two streams at various distances from the furnace.

(D) *Pyrolyzed carbon tetrachloride quenched with non-pyrolyzed p-xylene.*—The pyrolysis system shown was modified such that the manometer and stopcock were replaced by a 7 mm. quartz tube that extended to within one inch of the furnace. Provisions were made so that p-xylene could be metered into the system through this tube. The system was evacuated to 10 mm. Hg and 1.8 moles of carbon tetrachloride were metered to the system through the vaporizer at the rate of 0.026 mole/min. while 5.6 moles of p-xylene were being metered to the system at the other end at the rate of 0.08 mole/min. Pyrolysis of carbon tetrachloride occurred at 1000° C. for 0.015 sec. and the chlorocarbon pyrolyzate was quenched with non-pyrolyzed p-xylene at a point 4.5 inches away from the pyrolysis zone. The resulting solution was warmed to room temperature and the excess solvent separated by rapid evaporation at 60 mm. and 100° C. to afford 32 g. of non-volatile residue. This residue was dissolved in hot methanol and hexachlorobenzene (19 g.) crystallized in the form of white needles (M.P. 205–210° C.) when the solution was cooled to room temperature. The methanol mother liquor was separated by distillation at 1.5 mm. to give 5 g. of distillate (B.P. 50–70° C.) which was a mixture of p-methylbenzyl chloride (approximately 2 g.) and 2-chloro-p-xylene (approximately 3 g.), as indicated by infrared analysis and mass spectrometric analysis. The non-volatile residue (5 g., B.P. >100° C. at 1.5 mm.) was essentially hexachlorobenzene as indicated by its infrared spectrum.

Table 1

PRODUCTS ISOLATED VIA CO-AXIAL PYROLYSIS OF p-XYLENE AND CARBON TETRACHLORIDE

| Reaction Conditions: | | | | | | | | |
|---|---|---|---|---|---|---|---|---|
| Pyrolysis Temp. (° C.) | 1,030 | 1,020 | 1,000 | 1,010 | 1,000 | 1,040 | 1,030 | 1,030 |
| Residence Time ($10^{-3}$ sec.) | 6 | 6 | 6 | 6 | 6 | 5 | 6 | 8 |
| Blend Point (a) (inches) | −4.5 | −2.5 | 0.5 | 1.5 | 3.5 | 4.5 | 7.5 | 10.5 |
| Temp. of Blend Point | 1,030 | 1,020 | 990 | 950 | 700 | 600 | 400 | 300 |
| Moles p-xylene used | 12.1 | 9.2 | 11.1 | 8.3 | 18.5 | 30.6 | 7.18 | 5.75 |
| Moles CCl4 used | 13.9 | 7.3 | 12.0 | 5.6 | 25.4 | 35.6 | 9.00 | 7.27 |
| Products Isolated (moles): | | | | | | | | |
| p-ClCH$_2$C$_6$H$_4$CH$_2$Cl | 0 | 0 | 0 | 0.04 | 0.15 | 0.45 | 0.25 | 0.33 |
| p-CH$_3$C$_6$H$_4$CH$_2$Cl | 0.57 | 0.30 | 0.20 | 0.34 | 0.74 | 0.65 | 0.38 | 0.23 |
| p-CH$_3$C$_6$H$_4$CH=CCl$_2$ | 0.44 | 0.26 | 0.13 | 0.05 | 0 | 0 | 0 | 0 |
| (C$_9$H$_8$)$_2$ b | 0.37 | 0.22 | 0.16 | 0.21 | 0.38 | 1.51 | 0.22 | 0.32 |
| (C$_8$H$_6$Cl$_{0.7}$) ca. 7 c | 0.39 | 0.32 | 0.37 | 0.24 | 0.39 | 1.18 | 0.17 | 0.13 |
| Sum Total Xylyl Units | 1.77 | 1.10 | 0.86 | 0.88 | 1.66 | 4.79 | 1.02 | 1.01 |
| Percent Yield d | 15 | 12 | 8 | 11 | 9 | 16 | 14 | 18 |
| Expected Yield e | 13 | 10 | 7 | 9 | 7 | 15 | 13 | 16 | a Point of mixing measured in inches away from the furnace.
b Mixture of 1,2-di-p-tolylethane and methylated diphenylmethane.
c Residue isolated as decomposition products formed during separation by vacuum distillation.
d Moles of p-xylyl equivalents isolated × 100 ÷ moles of p-xylene pyrolyzed.
e Fractional conversion (F) of p-xylene to p-methylbenzyl radicals is given by $F = At \exp(-Bt)$ where $t$ is the residence time in seconds, A is the approximate rate constant for formation of p-methylbenzyl radical and B is approximate rate constant for thermal destruction of the radical. Below 1100° C., A and B are given by:
$$A = 2.61 \times 10^{15} \exp(-83.2/RT)$$
$$B = 8.45 \times 10^{14} \exp(-79.6/RT)$$

(E) *Pyrolyzed p-xylene quenched with non-pyrolyzed carbon tetrachloride.*—The pyrolysis system used in D above was evacuated to 4.5 mm. p-Xylene (6.4 moles) was metered at the rate of 0.035 mole/min. into the system and pyrolyzed at 1100° for $6 \times 10^{-3}$ sec. The pyrolyzate was quenched at a point 4.5 inches away from the pyrolysis zone with non-pyrolyzed carbon tetrachloride entering through the inlet at the other end of the pyrolysis system at 0.023 mole/min. The gas mixture was collected in 3.5 liters of hexane kept at −78°. The resulting clear solution was warmed to room temperautre and poly-(p-xylene) precipitated throughout the flask. This was removed by filtration to give 33 g. of dry polymer that contained no chlorine. The solvent of the mother liquor was separated by rapid evaporation at 60 mm. and 100° as described previously. The non-volatile residue (29 g.) also contained no chlorine and was a mixture of the usual products of p-xylene pyrolysis as indicated by infrared analysis. The distillate was a mixture of hexane, carbon tetrachloride, p-xylene and some toluene, as indicated by infrared analysis.

(F) *Pyrolysis of chloroform.* — Chloroform (5.5 moles) was metered at the rate of 0.046 mole/min. to the pyrolysis system evacuated to 2.5 mm. Hg pressure. Pyrolysis was effected at 1005° for $2 \times 10^{-3}$ sec. residence time and the pyrolyzate was collected in 4 liters of hexane kept at −78°. A second trap cooled with liquid nitrogen was used in series to collect gases that escaped condensation in the first one. The liquid nitrogen trap was warmed to room temperature and the gas stream evolved was passed through 3 liters of 1 N aqueous sodium hydroxide. The trap system was swept with nitrogen and the aqueous solution was back titrated with 0.5 N HCl. The result showed that 1.5 moles HCl were collected in the liquid nitrogen trap. An additional 0.2 mole was recovered from the Dry Ice trap using a similar procedure.

Mass spectrometric analysis of a sample of the chloroform pyrolyzate in hexane indicated that the solution contained 3.3 moles of CHCl$_3$, 0.7 mole of C$_2$Cl$_4$, 0.1 mole C$_2$Cl$_3$H, and a trace of phosgene. This solution was separated by distillation at atmospheric pressure to give 3 major fractions: (1) 3.0 kg., B.P. 65–72° C. This fraction was a hexane solution that contained 3.0 moles CHCl$_3$, 0.12 mole carbon tetrachloride and 0.06 mole C$_2$Cl$_3$H as indicated by mass spectrometric analysis; (2) 91 g., B.P. 120–121° C. This fraction was C$_2$Cl$_4$ as indicated by its boiling point and infrared spectrum. (3) 48 g. residue. This residue was dissolved in methanol and the solution was chilled to −78° C. to yield CCl$_3$CCl$_3$ (23 g.) in the form of white platelets (M.P. 181–183° C.). The mother liquor was evaporated to dryness leaving a mixture of C$_2$Cl$_4$ and C$_2$Cl$_6$ as residue (15 g.).

To show the presence of phosgene, aniline (150 cc.) was added to fraction 1. Aniline hydrochloride (4 g.) precipitated immediately and was removed by filtration. The mother liquor was allowed to remain overnight at room temperature and a white solid 2.5 g.) separated from solution. This precipitate was recrystallized from methanol to give diphenyl urea in the form of white needles (M.P. 239–240° C.; no depression in melting point when mixed with known sample of diphenyl urea). The infrared spectrum of this sample was also identical with that of the known compound.

Thus, the 5.5 moles of chloroform metered to the pyrolysis system were isolated as follows: 3.3 moles of recovered chloroform, 1.4 moles of C$_2$Cl$_4$, 0.2 mole of C$_2$Cl$_3$H, 0.2 mole of C$_2$Cl$_4$, 0.1 mole of CCl$_4$, and a trace of phosgene.

To determine whether H$_2$ or Cl$_2$ were produced in this reaction, the pyrolysis was repeated on a microscale using a closed system that was purged with nitrogen and then evacuated to 1 mm. Chloroform (1.5 g.) was pyrolyzed at 920° C. and 1 mm. for approximately 0.01 sec. residence time and the products were collected in a microcold trap kept at −78° C. No pressure rise was noted, indicating the absence of non-condensible gases such as H$_2$. The gases in this system at 1 mm. pressure were collected by means of a Toepler pump. Mass spectrometric analysis indicated that this gas sample was a mixture of CHCl$_3$, C$_3$Cl$_4$ and N$_2$.

(G) *Co-pyrolysis of p-xylene and chloroform.*—The apparatus used in C above was used for the coaxial pyrolysis of p-xylene and chloroform. A given quantity of p-xylene was metered to the system at a predetermined rate through the outer concentric tube while a second quantity of chloroform was metered to the system through the inner concentric tube. The two streams were pyrolyzed co-axially and then allowed to blend. The assigned structure was confirmed by N.M.R. analysis.

The distance from the pyrolysis zone to the blend point was increased in the series of experiments that are summarized in Table 2.

Table 2
PRODUCTS OBTAINED VIA CO-AXIAL PYROLYSIS OF p-XYLENE AND CHLOROFORM AS A FUNCTION OF BLEND POINT

| Pyrolysis Conditions | | | Feed Stock | | Estimated Amount | | Products Isolated (in grams) | | | | | | | | |
|---|---|---|---|---|---|---|---|---|---|---|---|---|---|---|---|
| T° C. | t (sec.) | P (mm.) | p-Xylene (grams) | CHCl₃ (grams) | Blend Point ᵃ | p-CH₃C₆H₄CH₂ produced (grams)ᵇ | (1) | (2) | (3) | (4) | (5) | (6) | (7) | (8) | (9) |
| 1,000 | 0.01 | 6.8 | 437 | 1,251 | 14.5 | 44 | 18 | 0 | 0.5 | 1 | 15 | 17 | | | (ᶜ) |
| 1,005 | 0.009 | 4.2 | 525 | 1,394 | 9.5 | 58 | 17 | 0 | 0 | 1.5 | 23 | 15 | 0.5 | 5 | |
| 1,000 | 0.005 | 2.5 | 365 | 810 | 4.5 | 22 | 9.4 | 0 | 0 | 8.5 | 10 | 16 | 2 | | (ᵈ) |
| 1,000 | 0.005 | 5.0 | 1,491 | 2,074 | 4.5 | 89 | | | | 28 | | | | | |
| 1,000 | 0.006 | 3.3 | 621 | 1,266 | 4.5 | 43 | | | | 15 | | | | | |
| 1,005 | 0.01 | 4.8 | 356 | 836 | 2.5 | 41 | 19 | 0 | 0 | 5 | 21 | 41 | 1 | | |
| 1,005 | 0.007 | 4.7 | 1,287 | 1,847 | 1.5 | 109 | | | | 1 | | | | | |
| 1,005 | 0.01 | 3.7 | 401 | 1,047 | −0.5 | 46 | 18 | 19 | 0 | 0 | 18 | 36 | | | |
| 1,010 | 0.006 | 3.3 | 453 | 1,135 | −10 | ᵉ 36 | 20 | 26 | 0 | 0 | 60 | 57 | | | |

(1) CH₃—C₆H₄—CH₂Cl.

(2) CH₃—C₆H₄—CH=CCl₂.

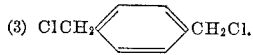

(3) ClCH₂—C₆H₄—CH₂Cl.

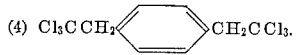

(4) Cl₃CCH₂—C₆H₄—CH₂CCl₃.

(5) Mixture of 1,2-di-p-tolylethane and methylated diphenylmethanes.
(6) Residue mixture chlorocarbons and hydro-chloro carbons.

(7) C₂Cl₄.
(8) C₆Cl₆.
(9) Miscellaneous products isolated and only partially characterized.

ᵃ Measured in inches away from the end of the furnace.
ᵇ Fractional conversion (F) of p-xylene to p-methylbenzyl radicals is given by $F = At \exp(-Bt)$ where t is the residence time in seconds, A is the approximate rate constant for formation of p-methylbenzyl radical and B is approximate rate constant for thermal destruction of the radical. Below 1100° C., A and B are given by:
$A = 2.61 \times 10^{15} \exp(-83.2/RT)$
$B = 8.45 \times 10^{14} \exp(-79.6/RT)$
ᶜ 0.5 g., M.P. 86–88°, B.P.—145° at 3 mm., percent Cl=75.9; percent H=0.46; percent C=23.9. Infrared spectrum indicated that product might be a highly conjugated or aromatic compound.
ᵈ 0.6 g., M.P. 111–113°, percent C=51.5; percent H=3.7; percent Cl=44.6; Mol Wt.=634. Infrared spectrum indicates the presence of p-xylylene and CCl₃ groups.
ᵉ Indicates considerable interaction in the pyrolysis zone.

(H) *Pyrolyzed p-xylene quenched with non-pyrolyzed chloroform.*—A stream of p-xylene (5.3 moles) was pyrolyzed at 1000° C. and 6 mm. Hg pressure for 0.005 sec. residence time. These are pyrolysis conditions known to afford 6% conversion p-xylene to p-methylbenzyl radicals. The pyrolyzate was quenched with non-pyrolyzed chloroform (9.6 moles) at a point 7 inches downstream where the temperature was only 500° C. The resultant gas mixture was collected in two liters of hexane kept at −78° C. Poly-(p-xylylene) (13 g.) was produced when the solution was warmed to room temperature. The polymer was removed by filtration. Virtually all the chloroform was recovered in the mother liquor as indicated by mass spectrometric analysis of an aliquot sample. The soluble products of pyrolysis were recovered from the mother liquor by distillation at atmospheric pressure. The residue (20 g.), after separation of p-xylene (B.P. 138° C.), was a mixture of low molecular weight products of p-xylene pyrolysis. Elementary analysis indicated that this residue contained only 0.3% chlorine.

(I) *C-pyrolysis of p-xylene and hexachloroethane.*—The pyrolysis system shown in L. A. Errede and B. F. Landrum, J. Am. Chem. Soc., 79, 4952 (1957) was modified to include a flask containing a weighed amount of hexachloroethane (419 g.) which was located between the manometer and the furnace. The temperature of this flask was kept at 95° C. The pyrolysis system was evacuated to 5 mm. pressure and p-xylene (672 g.) was metered to the system at the rate of 0.035 mole/min. The gas stream passed through the flask containing warm hexachloroethane into the pyrolysis furnace where copyrolysis occurred at 1000° C. for an average residence time of 0.006 second. The pyrolyzate was collected in toluene (3 liters) kept at −78° C. At the end of the pyrolysis the resultant solution was warmed to room temperature and volatile components were removed by rapid evaporation at 100° C. and 60 mm. pressure. A sample of the distillate was analyzed by means of a mass spectrometer and the presence of tetrachloroethylene and carbon tetrachloride in small amounts was detected. The residue (95 g.) was stored at room temperature for several days. A small amount (2.1 g.) of needle-like crystals precipitated from the dark oil. These were removed by filtration and washed with hexane. The product was purified by vacuum sublimation at 100° C. and subsequent recrystallization from methanol to give pure white needles of alpha, alpha' bistrichloromethyl-p-xylene (M.P. 174–175° C.). The infrared spectrum was identical with the known compound. The oily mother liquor was dissolved in hexane and the resultant solution was chilled to −78° C. to precipitate any additional alpha, alpha' bis-trichloromethyl-p-xylene or p-xylylene-dichloride. No precipitate formed, however, indicating the absence of these compounds in any significant amount. The hexane was then separated by distillation at atmospheric pressure and the residue was separated by distillation at 2.4 mm. to afford 5 major fractions: (1) 2 g., B.P. 70–90° C., (2) 20.2 g., B.P. 96–97° C., (3) 10.0 g., B.P. 120–135° C., (4) 11.8 g., B.P. 135–150° C. and (5) g. residue. Fraction 1 was mostly p-methylbenzyl chloride and fraction 2 was almost pure β,β-dichloro-p-methylstyrene as indicated by infrared analysis. Fraction 2 was recrystallized from methanol to yield 15 g. of β,β-dichloro-p-methylstyrene in the form of white platelets (M.P. 32.5–33.5° C.). The third and fourth fractions were identified by infrared analysis as mixtures of 4,4'-di-p-tolylethane and alkylated diphenylmethanes. These were combined and dissolved in methanol. The solution was chilled to −78° C. and 4,4'-di-p-tolylethane (6 g.) crystallized from solution in the form of pearl-white platelets (M.P. 74–76° C.). Fraction 5 was a complex mixture of decomposition products containing phenyl and olefinic groups as indicated by infrared analysis and chlorine as indicated by a qualitative test for halogen.

Alpha, alpha'-bis-trichloromethyl-p-xylene (0.716 g.; 0.0021 mole) was dissolved in methanol (25 cc.). Sodium methoxide (1.5 g.) was added and the mixture was warmed on a steam bath for 0.5 hour. The reaction mixture was diluted with cold water (100 cc.) and the insoluble product was removed by filtration. The amount of chloride ion present in the aqueous mother liquor was determined by gravimetric analysis. These results show that 0.0039 equivalent of chlorine (0.139 g.) were produced. Thus, about two moles of HCl were eliminated per mole of starting material.

The product was recrystallized from a methanol water solution to yield the compound in the form of pearl-like platelets (M.P. 74–75° C.). The infrared spectrum (strong bands at 11.02, 11.44, 12.15, 12.68μ) is consistent with the anticipated structure of β,β,β',β'-tetrachloro-p-divinyl benzene. The elemental analysis is consistent with the empirical formula for this compound.

Calcd. for $C_{10}H_6Cl_4$: C, 44.84; H, 2.42; Cl, 52.96. Found: C, 45.2; H, 2.02; Cl, 53.0.

The assigned structure was confirmed by N.M.R. analysis, (tau values: 2.46 for aromatic C–H and 3.18 for vinyl C–H).

A sample of $\beta,\beta,\beta',\beta'$-tetrachloro-p-divinylbenzene (1.5 g.) was oxidized at reflux temperature in 100 cc. of acetone saturated with $KMnO_4$. The solvent was removed by evaporation. The manganese dioxide was dissolved in aqueous HCl and the residue was leached with hot acetone. The acid residue (0.25 g.) was fused with $PCl_5$ (1 g.) and the melt was poured into mehanol (5 cc.). The ester was precipitated by addition to excess water and then recrystallized from a water-methanol solution to yield dimethyl terephthalate in the form of long white needles (M.P. 138.5–139.0° C. and no depression with a known sample).

Illustrative of additional halogen-containing hydrocarbons which may be co-pyrolyzed with the xylene compound are:

| | |
|---|---|
| $CHF_3$ | $CF_2N_2$ |
| $CH_2F_2$ | $CF_3N_2CF_3$ |
| $CClF_3$ | $CF_3CFBrCF_3$ |
| $CCl_2F_{21}$ | $BrCF_2CF_2CF_3$ |
| $CBrF_3$ | $CF_3CFICF_3$ |
| $CBr_2F_2$ | $ICF_2CF_2CF_3$ |

I claim:
1. A process for preparing derivatives of p-xylene comprising the step of:
   (a) pyrolyzing a p-xylene and a lower aliphatic halogenated hydrocarbon of not more than three carbon atoms while maintaining
      (1) a temperature in the range of from about 900 to 1300° C.,
      (2) a partial vapor pressure for said aromatic compound of less than about 150 mm. Hg, and
      (3) a contact time between the two respective compounds of from about 0.1 to 0.001 second.

2. A process for preparing derivatives of xylene compounds comprising the steps of:
   (a) pyrolyzing p-xylene and a lower aliphatic chlorinated hydrocarbon of not more than 3 carbon atoms while maintaining a temperature in the range of from about 900–1300° C., a partial vapor pressure for said p-xylene of less than 150 mm. Hg, and a contact time between the two respective compounds of from about 0.1 to 0.001 of a second, and
   (b) thereafter quenching and collecting the resulting vapors to a temperature below about −45° C. in a substantially non-reactive organic liquid.

References Cited by the Examiner

UNITED STATES PATENTS

| | | | |
|---|---|---|---|
| 2,864,855 | 12/1958 | Hopwood et al. | 260—610 X |
| 2,894,995 | 7/1959 | Schmerling | 260—651 |

FOREIGN PATENTS 203,848 11/1908 Germany.

LEON ZITVER, *Primary Examiner.*

HAROLD G. MOORE, *Examiner.*

R. E. MASSA, K. H. JOHNSON, K. V. ROCKEY, *Assistant Examiners.*